United States Patent
Tanaka

(10) Patent No.: US 10,613,631 B2
(45) Date of Patent: Apr. 7, 2020

(54) INPUT DEVICE, DISPLAY APPARATUS, AND VIBRATION STATE DETECTING METHOD OF INPUT DEVICE

(71) Applicant: FUJITSU TEN LIMITED, Kobe-shi, Hyogo (JP)

(72) Inventor: Takashi Tanaka, Kobe (JP)

(73) Assignee: FUJITSU TEN LIMITED, Kobe-shi (JP)

(*) Notice: Subject to any disclaimer, the term of this patent is extended or adjusted under 35 U.S.C. 154(b) by 0 days.

(21) Appl. No.: 15/371,900

(22) Filed: Dec. 7, 2016

(65) Prior Publication Data

US 2017/0205883 A1 Jul. 20, 2017

(30) Foreign Application Priority Data

Jan. 14, 2016 (JP) .................................. 2016-005556

(51) Int. Cl.
- *G06F 3/01* (2006.01)
- *G06F 3/041* (2006.01)
- *G06F 3/0488* (2013.01)

(52) U.S. Cl.
CPC ............. *G06F 3/016* (2013.01); *G06F 3/041* (2013.01); *G06F 3/0416* (2013.01); *G06F 3/04883* (2013.01); *G06F 2203/014* (2013.01)

(58) Field of Classification Search
CPC .... G06F 3/016; G06F 3/041; G06F 2203/014; G06F 3/0416; G06F 3/04883
See application file for complete search history.

(56) References Cited

U.S. PATENT DOCUMENTS

| | | | |
|---|---|---|---|
| 2002/0149561 A1* | 10/2002 | Fukumoto | G01C 21/3664 345/156 |
| 2007/0080951 A1* | 4/2007 | Maruyama | G06F 1/1626 345/173 |
| 2012/0232780 A1* | 9/2012 | Delson | A63F 13/06 701/400 |
| 2013/0229384 A1* | 9/2013 | Adachi | G06F 3/041 345/174 |
| 2014/0024414 A1* | 1/2014 | Fuji | G06F 3/016 455/566 |
| 2016/0034057 A1* | 2/2016 | Ikeda | H04M 1/03 345/173 |
| 2016/0162113 A1* | 6/2016 | Araki | G06F 3/016 345/173 |
| 2016/0334872 A1* | 11/2016 | Kim | G06F 3/016 |

FOREIGN PATENT DOCUMENTS

| | | |
|---|---|---|
| CN | 101630214 A | 1/2010 |
| CN | 102023734 A | 4/2011 |
| CN | 102483665 A | 5/2012 |
| JP | 2012-226478 A | 11/2012 |
| JP | 2013-109429 A | 6/2013 |
| JP | 2013-235614 A | 11/2013 |

* cited by examiner

*Primary Examiner* — Temesghen Ghebretinsae
*Assistant Examiner* — Sosina Abebe
(74) *Attorney, Agent, or Firm* — Oliff PLC

(57) ABSTRACT

An input device according to an embodiment includes a plurality of vibration elements that vibrate an operation surface and a controller. The controller detects, in a state where the controller causes one or more of the plurality of vibration elements to vibrate the operation surface, a vibration state of the operation surface by using at least one of other vibration elements of the vibration elements.

9 Claims, 10 Drawing Sheets

INPUT DEVICE, DISPLAY APPARATUS, AND VIBRATION STATE DETECTING METHOD OF INPUT DEVICE

CROSS-REFERENCE TO RELATED APPLICATION

This application is based upon and claims the benefit of priority of the prior Japanese Patent Application No. 2016-005556, filed on Jan. 14, 2016, the entire contents of which are incorporated herein by reference.

FIELD

The embodiment discussed herein is directed to an input device, a display apparatus, and a vibration state detecting method of the input device.

BACKGROUND

Conventionally, there is known an input apparatus that gives a sense of touch to a user to inform the user that the input of the user is accepted. The input apparatus generates vibration, for example, in accordance with pressure force by a user to inform the user that the input of the user is accepted (for example, Japanese Laid-open Patent Publication No. 2013-235614).

However, with regard to the conventional input device, a vibration state of an operation surface may vary by aging deterioration or temperature characteristics of a part such as an operation unit that includes the operation surface or a vibration element that vibrates the operation unit. Therefore, the feel of the operation surface for a user may not be kept constant.

SUMMARY

According to an aspect of an embodiment, an input device includes a plurality of vibration elements and a controller. The vibration elements vibrate an operation surface. The controller that detects, in a state where the controller causes one or more of the plurality of vibration elements to vibrate the operation surface, a vibration state of the operation surface by using at least one remaining vibration element of the plurality of vibration elements.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF EMBODIMENTS

Hereinafter, an exemplary embodiment of an input device, a display apparatus, and a vibration-state detecting method of the input device disclosed in the present application will be explained in detail with reference to the accompanying drawings. It is not intended that this invention be limited to the embodiment described below.

1. Vibration State Detecting Method of Input Device

Figure 1:
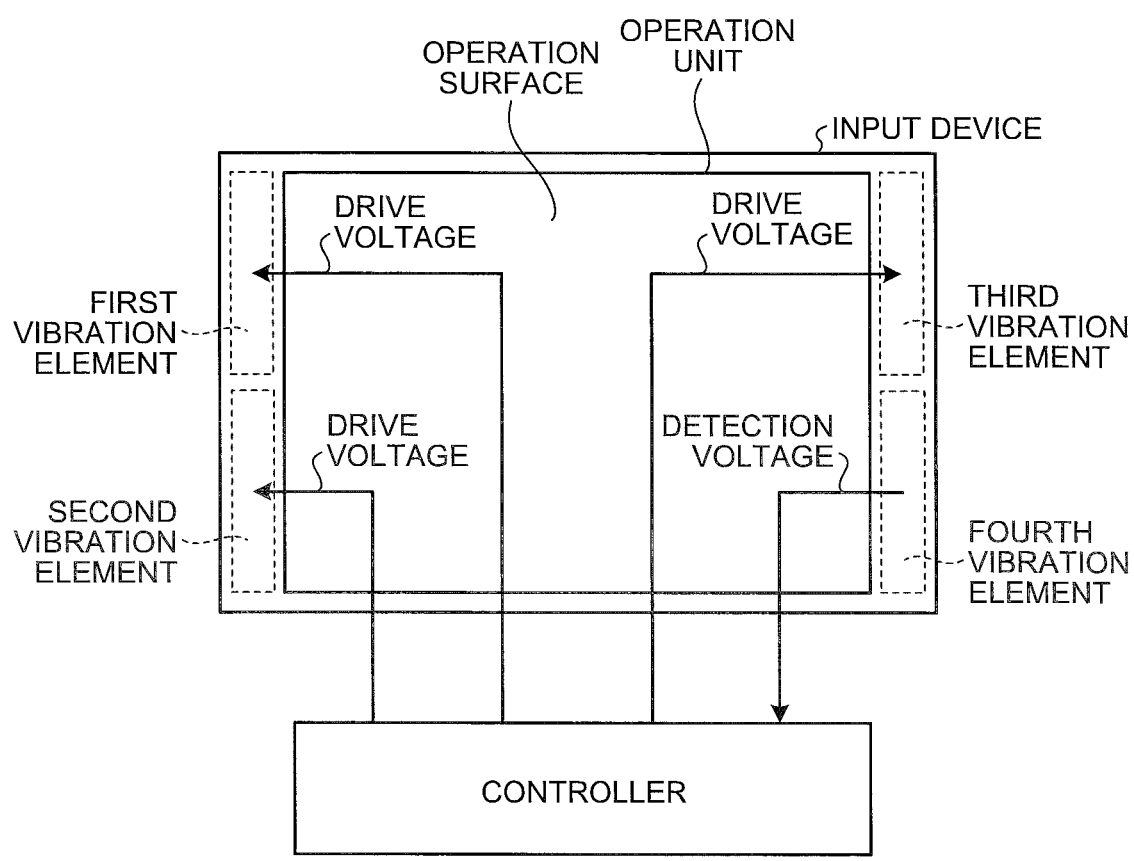
FIG. 1 is a diagram illustrating a vibration state detecting process of an input device according to an embodiment.

FIG. 1 is a diagram illustrating a vibration state detecting process of an input device according to an embodiment. As illustrated in FIG. 1, an input device according to an embodiment includes an operation unit, first to fourth vibration elements, and a controller, and it may be referred to as a touch-pad with a vibration function. As described later, the input device may be also used as a touch-pad with a vibration function in combination with a display such as a liquid crystal display.

The operation unit is a planar member having an information inputting function of, for example, an electrostatic capacity type. The operation unit includes an operation surface to detect a touch operation (hereinafter, may be referred to as user touch operation) of a user on the operation surface. For example, the user touches the operation surface with a finger or a stylus pen, and thus the user touch operation is performed.

The first to fourth vibration elements include, for example, piezoelectric elements, and are fixed to the operation unit by adhesive or the like, and thus can vibrate the operation surface of the operation unit. Therefore, for example, in such a state that a finger of the user is touched to the operation surface, the first to fourth vibration elements can be vibrated to give vibration to the finger of the user.

The controller can vary the frictional force between a finger of the user and the operation surface, because, for example, the first to fourth vibration elements vibrate, in such a state that the finger of the user is touched on the operation surface, the operation surface in the ultrasonic-wave frequency band to generate a membrane of an air layer between the finger of the user and the operation surface. When the user moves a finger in the state, the sense of touch according to the varied frictional force can be given to the finger.

With regard to the example illustrated in FIG. 1, the first to fourth vibration elements are provided to the input device as a plurality of vibration elements. However, it is sufficient that the number of the vibration elements is two or more, and the number of them is not limited to the example illustrated in FIG. 1.

When detecting a predetermined user touch operation on the operation surface, the controller of the input device vibrates the first to fourth vibration elements. From this, the controller of the input device can notify, by the vibration of the operation surface, the user that it accepts an input operation of the user to the input device. Moreover, the controller varies the vibration state (for example, vibration frequency, vibration cycle, vibration amount, etc.) to give different touch feelings to the user who is operating the operation surface.

By the way, for example, the vibration of the operation surface may not be sufficient by the aging variation or the temperature characteristics of a part (for example, vibration element, operation unit, adhesive that fixes vibration element to operation unit, etc.) of the input device. Therefore, in such a state that some (namely, one or more) of the first to fourth vibration elements vibrate the operation surface, the controller of the input device detects the vibration of the operation surface by using remaining at least one of the vibration elements (namely, by at least one of other vibration elements).

For example, as illustrated in FIG. 1, the controller can detect the vibration state of the operation surface on the basis of output voltage of the fourth vibration element while applying the drive voltage to the first to third vibration elements to vibrate the operation surface.

From this, whether or not the vibration state of the operation surface is varied by, for example, the aging deterioration or the temperature characteristics of a part of the input device can be detected. Moreover, because the vibration element that is used for vibrating the operation surface is doubled as the vibration element that is used for detecting the vibration of the operation surface, separately adding a part that detects the vibration of the operation surface can be avoided, and thus the vibration state of the input device can be detected while suppressing the cost and the number of parts.

Moreover, the vibration state by each of the vibration elements can be grasped by changing the combination of, within a plurality of the vibration elements, the vibration elements that vibrate the operation surface and the vibration elements that detect the vibration of the operation surface. For example, a state of the deterioration or the failure of the first to fourth vibration elements can be grasped by, for example, sequentially changing the first to fourth vibration elements one by one as the vibration element that detects the vibration state of the operation surface.

When the vibration state of the operation surface varies from, for example, that at product shipment, the vibration state of the input device can be corrected by adjusting the drive voltage that drives the vibration elements so that the vibration amount of the vibration state of the operation surface is constant. Therefore, the product quality of the input device can be improved.

Hereinafter, the input device according to the embodiment will be explained in more detail. The display apparatus in which the input device is combined with the display will be described below as an example. The display apparatus is here exemplified as, for example, a navigation apparatus mounted on a vehicle, however, it may be a smartphone, a tablet terminal, a personal computer, etc.

2. Display Apparatus

Figure 2:
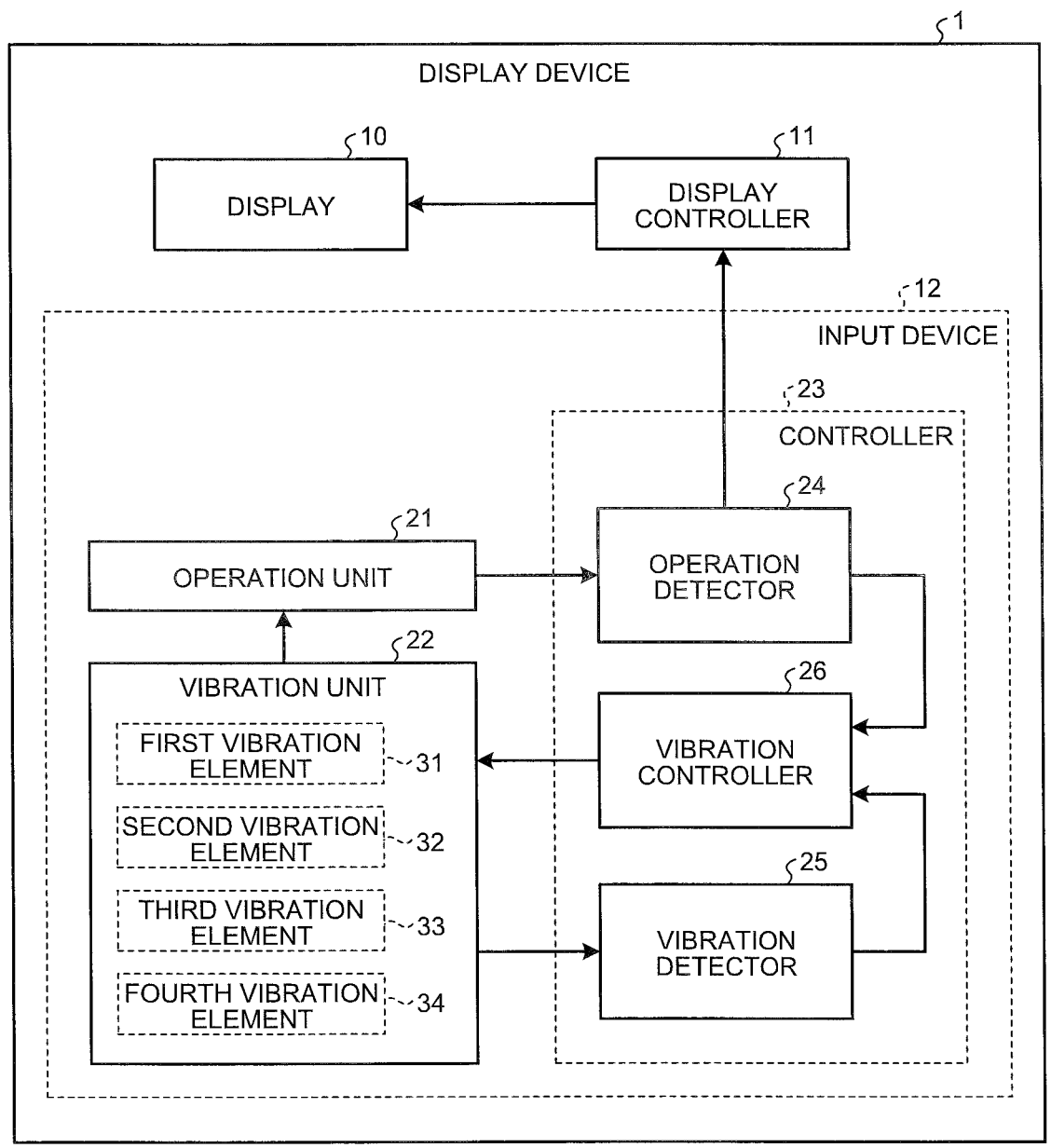
FIG. 2 is a diagram illustrating a configuration of a display apparatus according to the embodiment.

FIG. 2 is a diagram illustrating a configuration of a display apparatus according to the present embodiment. As illustrated in FIG. 2, a display apparatus 1 includes a display 10, a display controller 11, and an input device 12.

2.1. Display

The display 10 includes, for example, a liquid crystal display or an organic light emitting display (organic EL display) to display an image based on the data of the image that is output from the display controller 11. Therefore, an image that is output form the display controller 11 can be presented to the user.

2.2. Display Controller

The display controller 11 generates an image to be displayed on the display 10 on the basis of, for example, an input operation that is accepted by the input device 12 from the user. The display controller 11 outputs to the display 10 the data of the generated image.

2.3. Input Device

The input device 12 accepts an input operation of the user to the display apparatus 1, and outputs a signal according to the input operation of the user to the display controller 11. The input device 12 includes an operation unit 21, a vibration unit 22, and a controller 23.

2.3.1. Operation Unit

The operation unit 21 is, for example, a planar member having an information inputting function of an electrostatic capacity type. Moreover, it is sufficient that the operation unit 21 has a configuration in which the operation surface that can detect the touch of the user is included, however, not limited to an electrostatic capacity type, for example, an operation unit, which detects a touch of the user, of an infrared type, a resistive film type, etc. may be employed.

Figure 3:
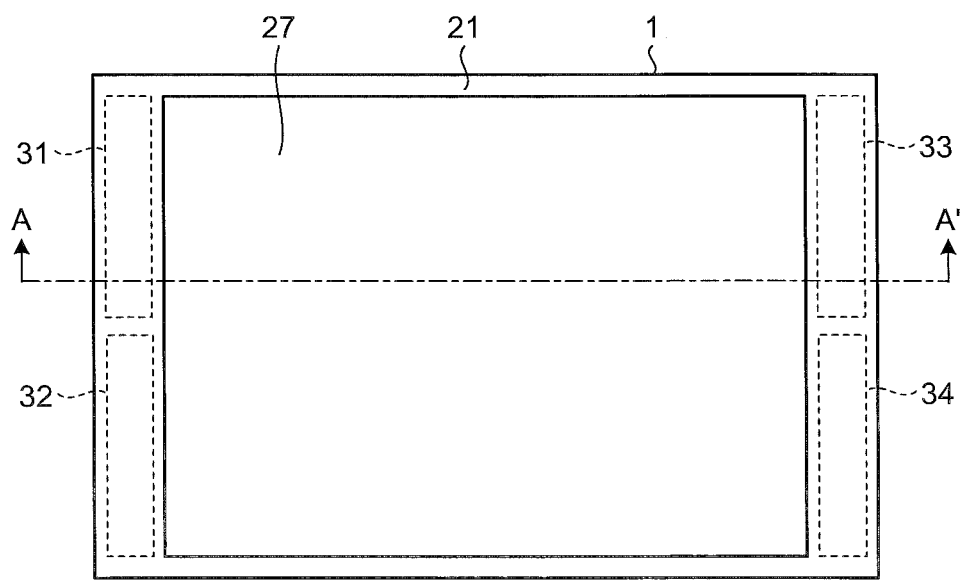
FIG. 3 is a schematic front view illustrating the display apparatus according to the embodiment.

FIG. 3 is a schematic front view illustrating the display apparatus 1. As illustrated in FIG. 3, an operation surface 27 that accepts the input operation by the user is arranged on the front side of the operation unit 21. When the user touches the operation surface 27, the operation unit 21 outputs to an operation detector 24 the detected value according to the touch position of the user.

2.3.2. Vibration Unit

The vibration unit 22 includes first to fourth vibration elements 31 to 34 (hereinafter, may be collectively referred to as vibration elements 30). The vibration elements 30 include piezoelectric actuators such as piezoelectric elements (piezo elements) to vibrate the operation unit 21 by expanding and contracting by the alternating-current voltage that is supplied from a vibration controller 26.

The operation unit 21 can be effectively vibrated when the vibration frequency of the vibration elements 30 is set to the resonance frequency of the operation unit 21. The vibration frequency of the vibration elements 30 is in, for example, the ultrasonic wave band, however, it may be a frequency other than that of the ultrasonic wave band.

Figure 4:
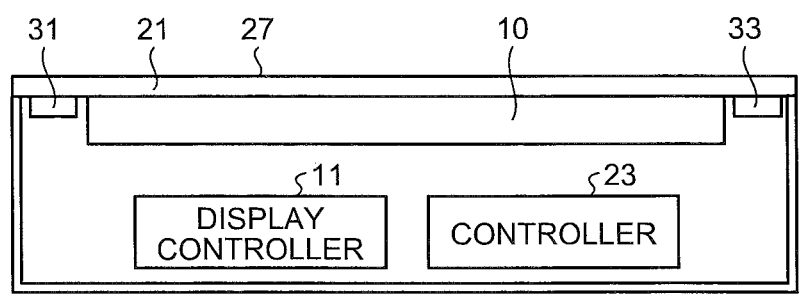
FIG. 4 is a schematic cross-sectional view taken along a line A-A' illustrated in FIG. 3.

FIG. 4 is a schematic cross-sectional view taken along a line A-A' illustrated in FIG. 3. As illustrated in FIGS. 3 and 4, the first to fourth vibration elements 31 to 34 are fixed, by adhesive or the like, to the peripheral part of the operation surface 27 of the operation unit 21 on the back side of the operation unit 21. FIG. 4 is a schematic view illustrating an arrangement example of the operation surface 27 and the vibration elements 30, and thus the display controller 11 and the controller 23 are only illustrated to be arranged inside the display apparatus 1.

The number and arrangement of the vibration elements 30 illustrated in FIGS. 2 to 4 are an example, and are not limited thereto. The number of the vibration elements 30 may be, for example, two or three. Moreover, the number of the vibration elements 30 may be 5 or more. For example, respective two of the vibration elements 30 are arranged on both the right and left ends of the operation unit 21 illustrated in FIG. 3, and each of the respective two is arranged on the upper and lower sides of the operation unit 21, however, the vibration elements 30 may have a configuration in which, for example, respective one of them is arranged on both the right and left ends of the operation unit 21 illustrated in FIG. 3.

The case in which piezoelectric elements are employed as the vibration elements 30 is here explained, however, not limited thereto, it is sufficient that the vibration elements 30 include an element that vibrates the operation surface 27 at a predetermined frequency (for example, ultrasonic-wave frequency band), and further outputs a signal (voltage or current) according to the vibration state of the operation surface 27.

2.3.3. Controller

The controller 23 detects the user operation on the operation surface 27 of the operation unit 21 (see FIGS. 3 and 4) to notify the display controller 11 of the detection result. Moreover, the controller 23 controls the vibration of the operation surface 27 of the operation unit 21.

The controller 23 includes a microcomputer, which includes a Central Processing Unit (CPU), a Read Only Memory (ROM), a Random Access Memory (RAM), an input/output port, etc., and various circuits. The CPU of the microcomputer realizes the control to be mentioned later by loading and executing a program stored in the ROM.

The controller 23 includes the operation detector 24, a vibration detector 25, and a vibration controller 26. For example, the CPU loads and executes the program, and thus functions of the operation detector 24, the vibration detector 25, and the vibration controller 26 are realized.

Moreover, each of the operation detector 24, the vibration detector 25, and the vibration controller 26 may be partly or wholly constituted of hardware such as an Application Specific Integrated Circuit (ASIC) or a Field Programmable Gate Array (FPGA).

2.3.3.1. Operation Detector

The operation detector 24 detects the touch position of the user for the operation surface 27 on the basis of the detected value output from the operation unit 21. For example, the operation detector 24 detects the touch position of the user in a predetermined cycle. The operation detector 24 determines, on the basis of the touch position of the user, whether or not the user performs a predetermined operation to the operation surface 27.

For example, the operation detector 24 detects the user operation such as a scroll operation, a flick operation, a tapping operation, or a gesture operation to the operation surface 27. The operation detector 24 notifies the display controller 11 and the vibration controller 26 of the detection result of the user operation to the operation surface 27.

2.3.3.2. Vibration Detector

The vibration detector 25 detects the vibration states of the first to fourth vibration elements 31 to 34. The vibration detector 25 can detect the vibration states of the first to fourth vibration elements 31 to 34 on the basis of, for example, output voltages Vd1 to Vd4 (hereinafter, may be referred to as output voltages Vd) of the first to fourth vibration elements 31 to 34.

In such a state that the drive voltage Vs is applied to some vibration elements 30 of the first to fourth vibration elements 31 to 34, and further is not applied to remaining vibration elements 30, the output voltages Vd are output from the remaining vibration elements 30.

Figure 5:
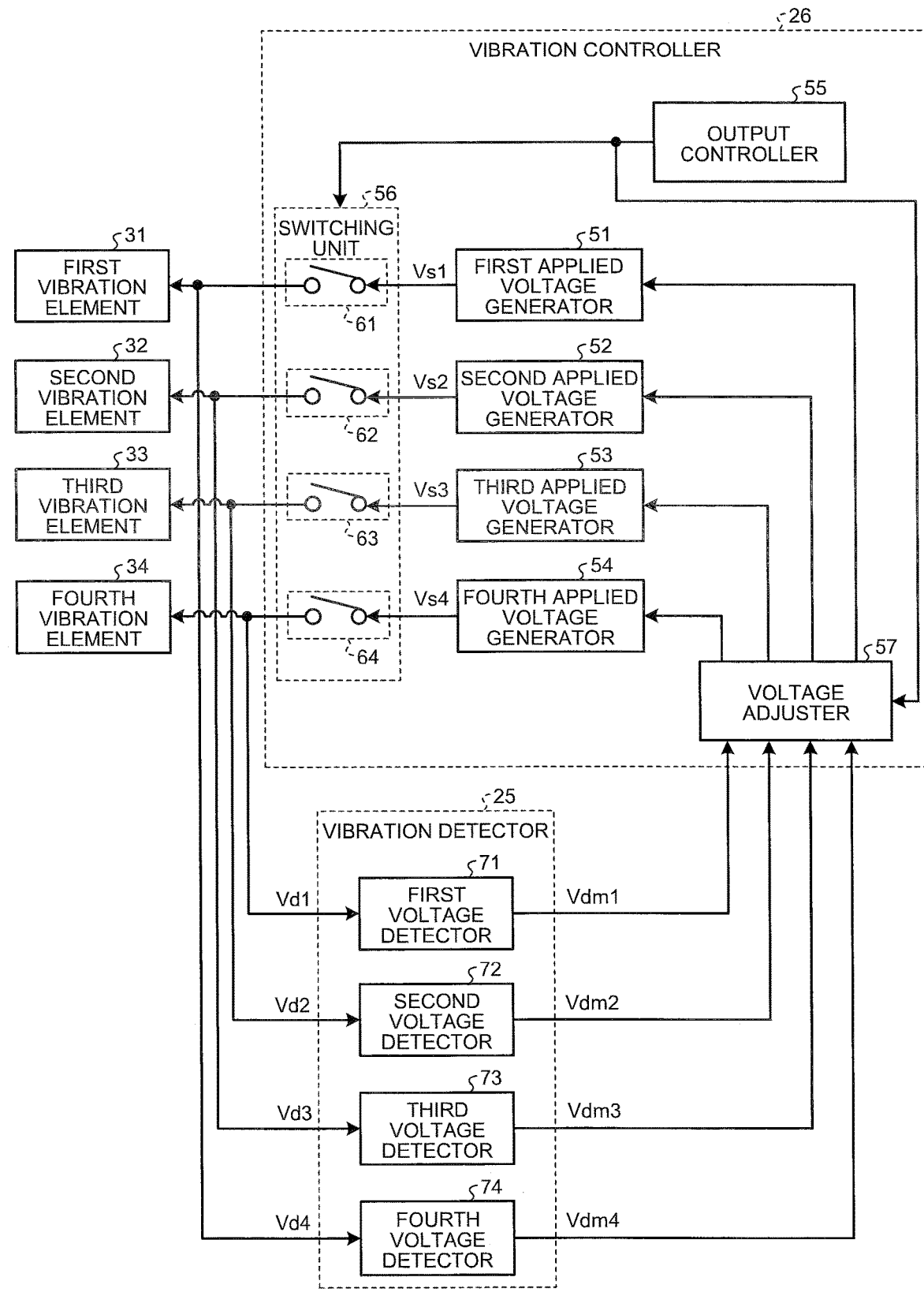
FIG. 5 is a diagram illustrating a configuration example of a vibration controller and a vibration detector, which are illustrated in FIG. 2.

FIG. 5 is a diagram illustrating a configuration example of the vibration detector 25 and the vibration controller 26. As illustrated in FIG. 5, the vibration detector 25 includes first to fourth voltage detectors 71 to 74. The first voltage detector 71 detects amplitude Vdm1 of the output voltage Vd1 of the first vibration element 31, the second voltage detector 72 detects amplitude Vdm2 of the output voltage Vd2 of the second vibration element 32.

The third voltage detector 73 detects amplitude Vdm3 of the output voltage Vd3 of the third vibration element 33, and the fourth voltage detector 74 detects amplitude Vdm4 of the output voltage Vd4 of the fourth vibration element 34.

2.3.3.3. Element Controller

The vibration controller 26 can switch and execute, for example, a vibration mode (one example of first mode) and a correction mode (one example of second mode). The vibration mode is an operation mode in which the first to fourth vibration elements 31 to 34 are driven to vibrate the operation surface 27 in accordance with the user operation to the operation surface 27.

For example, when a predetermined user operation (for example, scroll operation, flick operation, tapping operation, gesture operation, etc.) to the operation surface 27 is detected by the operation detector 24, the vibration controller 26 drives the first to fourth vibration elements 31 to 34. Moreover, as a predetermined user operation to the operation surface 27, when the touch by the user on the operation surface 27 is detected by the operation detector 24, the vibration controller 26 can also drive the first to fourth vibration elements 31 to 34.

The correction mode is an operation mode in which, in such a state that the operation surface 27 is vibrated by at least one vibration element 30 of the first to fourth vibration elements 31 to 34, the vibration of the operation surface 27 is detected by using remaining at least one of the vibration elements 30.

As illustrated in FIG. 5, the vibration controller 26 includes first to fourth applied voltage generators 51 to 54 (hereinafter, may be referred to as applied voltage generators 50), an output controller 55, a switching unit 56, and a voltage adjuster 57. The respective first to fourth applied voltage generators 51 to 54 generate the drive voltages Vs1 to Vs4 (hereinafter, may be collectively referred to as drive voltages Vs) according to the amplitude value and the frequency that are set by the voltage adjuster 57.

Figure 6:
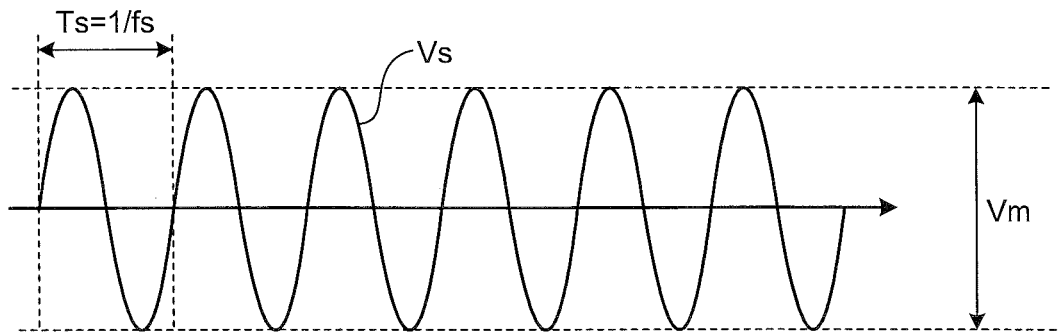
FIG. 6 is a diagram illustrating an example of drive voltage.

FIG. 6 is a diagram illustrating an example of the drive voltage Vs. As illustrated in FIG. 6, the drive voltage Vs is the alternating-current voltage whose frequency is a frequency fs and whose amplitude is amplitude Vm. The drive voltage Vs illustrated in FIG. 6 is the voltage of a sine wave, however, the drive voltage Vs may be the voltage of a triangle wave, a pulsed wave, etc.

In the vibration and correction modes, the output controller 55 controls the switching unit 56 to select, within the drive voltages Vs1 to Vs4 that are generated by the first to fourth applied voltage generators 51 to 54, the drive voltage Vs to be output to the vibration unit 22. The switching unit 56 includes switches 61 to 64.

The output controller 55 applies the drive voltage Vs1, which is generated by the first applied voltage generator 51, to the first vibration element 31 by turning the switch 61 ON, and thus causes the first vibration element 31 to vibrate. The output controller 55 applies the drive voltage Vs2, which is generated by the second applied voltage generator 52, to the second vibration element 32 by turning the switch 62 ON, and thus causes the second vibration element 32 to vibrate.

The output controller 55 applies the drive voltage Vs3, which is generated by the third applied voltage generator 53, to the third vibration element 33 by turning the switch 63 ON, and thus causes the third vibration element 33 to vibrate. The output controller 55 applies the drive voltage Vs4, which is generated by the fourth applied voltage generator 54, to the fourth vibration element 34 by turning the switch 64 ON, and thus causes the fourth vibration element 34 to vibrate.

For example, when the operation mode is the vibration mode, the output controller 55 controls the switching unit 56 to turn all of the switches 61 to 64 ON. From this, the drive voltages Vs1 to Vs4 are input to the first to fourth vibration elements 31 to 34, respectively.

For example, when the operation mode is the correction mode, the output controller 55 controls the switching unit 56 to switch, between the switches 61 to 64, the switches to be turned ON and the switches to be turned OFF in accordance with a predetermined rule.

For example, one of the switches 61 to 64 to be turned OFF is changed to another switch to be turned OFF. From this, the drive voltage Vs is not input to one vibration element 30 of the first to fourth vibration elements 31 to 34, and the vibration element 30 to which the drive voltage Vs is not input in this manner is changed. Therefore, some of the vibration elements 30 can be used as vibration elements that vibrate the operation surface 27, and further the remaining vibration elements 30 can be used as vibration elements that detect the vibration of the operation surface 27.

Moreover, the output controller 55 can control the first to fourth applied voltage generators 51 to 54. For example, when the operation mode is the correction mode, the output controller 55 can turn ON, within the first to fourth applied voltage generators 51 to 54, the operation of the applied voltage generators 50 that generate the drive voltages Vs that are to be output to the vibration unit 22, and further can turn OFF the remaining applied voltage generators 50.

When the operation of the applied voltage generators 50 is turned OFF by the output controller 55, the applied voltage generators 50 can sets the output to be high impedance. In this case, the output controller 55 has functions of the switching unit 56, and the switching unit 56 illustrated in FIG. 5 may not be provided.

The voltage adjuster 57 adjusts the amplitude and the frequency of the drive voltages Vs1 to Vs4 that are generated by the first to fourth applied voltage generators 51 to 54. The voltage adjuster 57 sets, for example, in the initial state, the initial values of the amplitude and the frequency of the drive voltages Vs1 to Vs4 in the first to fourth applied voltage generators 51 to 54.

The voltage adjuster 57 can detect the vibration state of the operation surface 27 by the first to fourth vibration elements 31 to 34 on the basis of the amplitudes Vdm1 to Vdm4 of the output voltages Vd1 to Vd4, and further can adjust the amplitudes and the frequencies of the drive voltages Vs1 to Vs4 on the basis of the vibration state. The processing is executed, for example, in a cycle (for example, once a day), or at start-up of the display apparatus 1.

Figure 7:
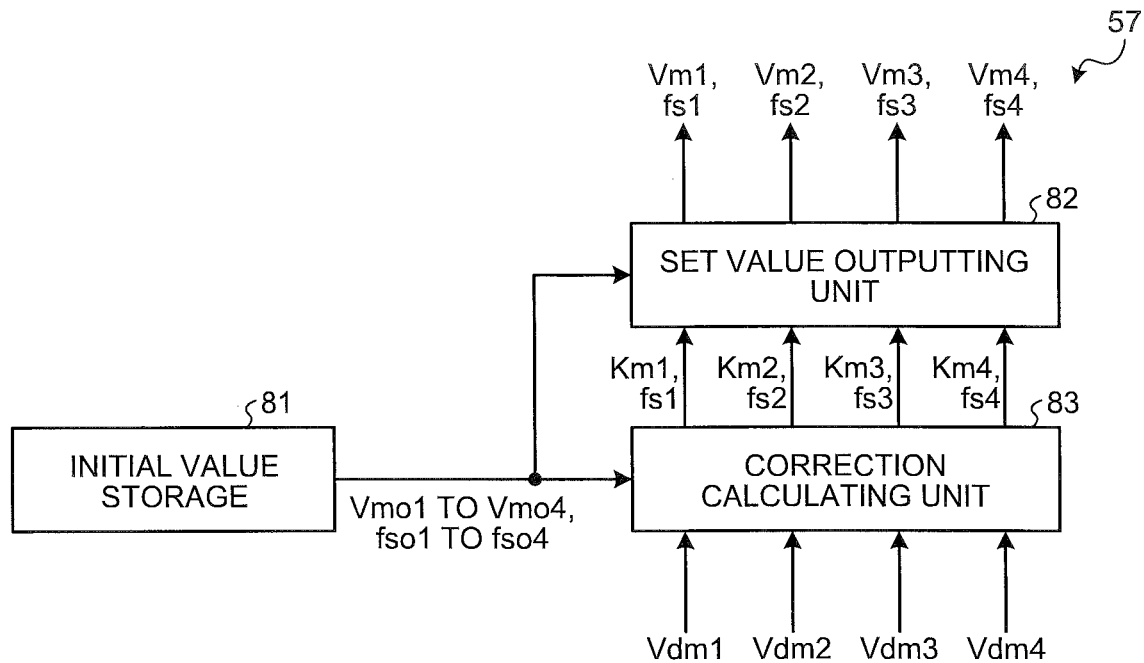
FIG. 7 is a diagram illustrating a configuration example of a voltage adjuster illustrated in FIG. 5.

FIG. 7 is a diagram illustrating a configuration example of the voltage adjuster 57. The voltage adjuster 57 illustrated in FIG. 7 includes an initial value storage 81, a set value outputting unit 82, and a correction calculating unit 83.

The initial value storage 81 stores initial amplitude values Vmo1 to Vmo4 of the drive voltages Vs1 to Vs4 and initial frequency values fso1 to fso4 of the drive voltages Vs1 to Vs4. The initial amplitude values Vmo1 to Vmo4 and the initial frequency values fso1 to fso4 are, for example, initial values of the drive voltages Vs1 to Vs4 that are adjusted in manufacturing the display apparatus 1, and are set, for example, in manufacturing or at factory shipment of the display apparatus 1.

The set value outputting unit 82 sets the amplitude setting values Vm1 to Vm4 and the frequency setting values fs1 to fs4 in the first to fourth applied voltage generators 51 to 54. Specifically, the set value outputting unit 82 sets the amplitude setting value Vm1 and the frequency setting value fs1 in the first applied voltage generator 51. From this, the first applied voltage generator 51 generates and outputs the drive voltage Vs1 so that the amplitude and the frequency coincide with the amplitude setting value Vm1 and the frequency setting value fs1.

The set value outputting unit 82 sets the amplitude setting value Vm2 and the frequency setting value fs2 in the second applied voltage generator 52. From this, the second applied voltage generator 52 generates and outputs the drive voltage Vs2 so that the amplitude and the frequency coincide with the amplitude setting value Vm2 and the frequency setting value fs2.

The set value outputting unit 82 sets the amplitude setting value Vm3 and the frequency setting value fs3 in the third applied voltage generator 53. From this, the third applied voltage generator 53 generates and outputs the drive voltage Vs3 so that the amplitude and the frequency coincide with the amplitude setting value Vm3 and the frequency setting value fs3.

The set value outputting unit 82 sets the amplitude setting value Vm4 and the frequency setting value fs4 in the fourth applied voltage generator 54. From this, the fourth applied voltage generator 54 generates and outputs the drive voltage Vs4 so that the amplitude and the frequency coincide with the amplitude setting value Vm4 and the frequency setting value fs4.

The set value outputting unit 82 sets, in the initial state, the initial amplitude values Vmo1 to Vmo4 and the initial frequency values fso1 to fso4, which are stored in the initial value storage 81, in the first to fourth applied voltage generators 51 to 54 as the amplitude setting values Vm1 to Vm4 and the frequency setting values fs1 to fs4.

Next, when the operation mode is the vibration mode, the set value outputting unit 82 sets the amplitude setting values Vm1 to Vm4 and the frequency setting values fs1 to fs4 in the first to fourth applied voltage generators 51 to 54. When the amplitude setting values Vm1 to Vm4 and the frequency setting values fs1 to fs4 are changed on the basis of the calculation of the correction calculating unit 83, the set value outputting unit 82 sets the changed amplitude setting values Vm1 to Vm4 and the changed frequency setting values fs1 to fs4 in the first to fourth applied voltage generators 51 to 54.

For example, the set value outputting unit 82 sets the frequency setting values fs1 to fs4, which are changed by the correction calculating unit 83, in the first to fourth applied voltage generators 51 to 54. The set value outputting unit 82 changes the amplitude setting values Vm1 to Vm4 on the basis of second amplitude adjusting coefficients Km1 to Km4, which are notified from the correction calculating unit 83, to set the changed amplitude setting values Vm1 to Vm4 in the first to fourth applied voltage generators 51 to 54.

The set value outputting unit 82 sets, in a frequency correction controlling process in the correction mode, the frequency setting values fs1 to fs4 in the first to fourth applied voltage generators 51 to 54 while shifting by a predetermined value Δfs.

Therefore, the drive voltages Vs1 to Vs4 whose frequencies are changed by a predetermined value Δfs are output from the first to fourth applied voltage generators 51 to 54. It is preferable that the frequencies of the drive voltages Vs1 to Vs4, which are output simultaneously from the first to fourth applied voltage generators 51 to 54, are the same, however, the frequencies of the drive voltages Vs1 to Vs4 may not be necessarily completely the same.

The set value outputting unit 82, in an amplitude correction controlling process of the correction mode, multiplies the amplitude setting values Vm1 to Vm4 by the first amplitude adjusting coefficients Kn1 to Kn4, respectively, and sets the multiplied result in the first to fourth applied voltage generators 51 to 54 as new amplitude setting values Vm1 to Vm4.

The first amplitude adjusting coefficients Kn1 to Kn4 (>1) are set to the values that compensate the difference of the vibration amount by the difference between the number of the vibration elements 30 that are vibrated in the vibration mode and the number of the vibration elements 30 that are vibrated in the correction mode. In other words, the first amplitude adjusting coefficients Kn1 to Kn4 are set so that the vibration amount of the operation surface 27 of the operation unit 21 is not different between the vibration mode and the correction mode.

As described later, in the amplitude correction controlling process of the correction mode, the set value outputting unit 82 may be set so that the amplitude setting values Vm1 to Vm4 are not changed. In this case, the correction calculating unit 83 can generate the second amplitude adjusting coefficients Km1 to Km4 so that they compensate the difference of the vibration amount between the vibration mode and the correction mode.

The correction calculating unit 83, in the frequency correction controlling process of the correction mode, decides the frequency setting values fs1 to fs4 on the basis of the amplitudes Vdm1 to Vdm4 that are detected by the vibration detector 25. For example, the correction calculating unit 83 can decide, as the frequency setting values fs1 to fs4, the frequency of the drive voltages Vs1 to Vs4 that maximize the average value of the amplitudes Vdm1 to Vdm4.

Therefore, for example, even when the resonance frequency of the operation unit 21 deviates by the temperature change of the operation unit 21, the frequencies of the drive voltages Vs1 to Vs4 can be fitted to the resonance frequency of the operation unit 21, and thus the operation unit 21 can be effectively vibrated.

Moreover, the correction calculating unit 83 can decide, for example, the frequencies of the drive voltages Vs1 to Vs4, at which one or more of the amplitudes Vdm1 to Vdm4 becomes locally maximum or maximum, as the frequency setting values fs1 to fs4.

Also, the correction calculating unit 83 can decide, for example, the frequencies of the drive voltages Vs1 to Vs4, at which an average value Vdmav of the amplitudes Vdm1 to Vdm4 or one or more of the amplitudes Vdm1 to Vdm4 becomes a threshold or more, as the frequency setting values fs1 to fs4.

In the frequency correction controlling process of the correction mode, after deciding the frequency setting values fs1 to fs4, the correction calculating unit 83 sets the decided frequency setting values fs1 to fs4 in the set value outputting unit 82. From this, the drive voltages Vs1 to Vs4 whose frequencies coincide with the frequency setting values fs1 to fs4 that are adjusted by the correction calculating unit 83 can be output.

Moreover, the correction calculating unit 83 may also notify the set value outputting unit 82 of differences Δfs1 to Δfs4 between the decided frequency setting values fs1 to fs4 and the frequency setting values fs1 to fs4. In this case, the set value outputting unit 82 generates the frequency setting values fs1 to fs4 by adding the differences Δfs1 to Δfs4 to the frequency setting values fs1 to fs4, respectively.

The correction calculating unit 83, in a voltage-correction controlling process of the correction mode, calculates the second amplitude adjusting coefficients Km1 to Km4, which correct the amplitudes of the drive voltages Vs1 to Vs4, on the basis of the amplitudes Vdm1 to Vdm4 that are detected by the vibration detector 25.

For example, the correction calculating unit 83 can derive ratios of respective amplitudes Vdm1 to Vdm4 to the initial amplitude values Vmo1 to Vmo4 as the second amplitude adjusting coefficients Km1 to Km4. For example, the correction calculating unit 83 can derive the second amplitude adjusting coefficients Km1 to Km4 by calculation of following equations (1) to (4).

$$Km1 = Vmo1/Vdm1 \tag{1}$$

$$Km2 = Vmo2/Vdm2 \tag{2}$$

$$Km3 = Vmo3/Vdm3 \tag{3}$$

$$Km4 = Vmo4/Vdm4 \tag{4}$$

In this case, the set value outputting unit 82 can update the new amplitude setting values Vm1 to Vm4 by multiplying the respective amplitude setting values Vm1 to Vm4 by the second amplitude adjusting coefficients Km1 to Km4.

In the aforementioned example, the amplitude Vdm of the drive voltage Vs, which generates vibration amount A (vibration amount A is arbitrary) on the operation surface 27, is explained to be the same as the amplitude Vdm of the output voltage Vd that is generated by the vibration amount A, however, these may be sometimes different. In this case, the correction calculating unit 83 can generate the second amplitude adjusting coefficients Km1 to Km4 considering the difference of the corresponding relation between the amplitude Vdm of the drive voltage Vs and the amplitude Vdm of the output voltage Vd in the vibration amount A.

For example, the correction calculating unit 83 can set a ratio Dm of the amplitude Vdm of the drive voltage Vs to the amplitude Vdm of the output voltage Vd at the vibration amount A as an adjustment coefficient Kmd, and can derive the second amplitude adjusting coefficients Km1 to Km4 by calculation of following equations (5) to (8). Moreover, because it is sufficient that the difference of the corresponding relation between the amplitude Vdm of the drive voltage Vs and the amplitude Vdm of the output voltage Vd is compensated, generation of the second amplitude adjusting coefficients Km1 to Km4 is not limited to the following equations (5) to (8).

$$Km1 = Dm \times Vmo1/Vdm1 \tag{5}$$

$$Km2 = Dm \times Vmo2/Vdm2 \tag{6}$$

$$Km3 = Dm \times Vmo3/Vdm3 \tag{7}$$

$$Km4 = Dm \times Vmo4/Vdm4 \tag{8}$$

When the set value outputting unit 82 does not change the amplitude setting values Vm1 to Vm4 in the amplitude correction controlling process in the correction mode, the correction calculating unit 83 can generate the second amplitude adjusting coefficients Km1 to Km4 so as to compensate the difference of the vibration amount between the vibration mode and the correction mode. In this case, the correction calculating unit 83 can multiply the right sides of the equations (1) to (4) by the coefficients K1 to K4 that compensate the difference of the vibration amount between the vibration mode and the correction mode, and also can multiply the right sides of the equations (5) to (8) by the coefficients K1 to K4.

In the aforementioned example, the correction calculating unit 83 derives the second amplitude adjusting coefficients Km1 to Km4 on the basis of ratios of the respective initial amplitude values Vmo1 to Vmo4 to the amplitudes Vdm1 to Vdm4, however, a calculation method of the second amplitude adjusting coefficients Km1 to Km4 is not limited thereto.

For example, the correction calculating unit 83 may derive the second amplitude adjusting coefficients Km1 to Km4 on the basis of ratios of the average value Vmoav of the initial amplitude values Vmo1 to Vmo4 to the average value Vdmav of the amplitudes Vdm1 to Vdm4. For example, the correction calculating unit 83 can derive the second amplitude adjusting coefficients Km1 to Km4 (hereinafter, may be collectively referred to as second amplitude adjusting coefficients Km) by calculation of the following equation (9) or the following equation (10).

$$Km = Vmoav/Vdmav \quad (9)$$

$$Km = Dm \times Vmoav/Vdmav \quad (10)$$

Moreover, the correction calculating unit 83 may also set, without executing the aforementioned calculation, previously set second amplitude adjusting coefficients Km in the set value outputting unit 82 on the basis of, for example, the amplitudes Vdm1 to Vdm4 detected by the vibration detector 25.

For example, when the average value Vdmav of the amplitudes Vdm1 to Vdm4 is a threshold TH or less, the correction calculating unit 83 may set previously set fixed coefficient Ko in the set value outputting unit 82 as the second amplitude adjusting coefficient Km.

A plurality of thresholds TH to be compared with the average value Vdmav may be set, and further the fixed coefficients Ko that differ in multistage may be previously set. For example, the correction calculating unit 83 includes first to third thresholds TH1 to TH3 and first to third fixed coefficients Ko1 to Ko3.

In this case, if the average value Vdmav is less than the first threshold TH1 and is equal to or more of the second threshold TH2, the correction calculating unit 83 sets a first fixed coefficient Ko1 as the second amplitude adjusting coefficient Km. If the average value Vdmav is less than the second threshold TH2 and is equal to or more of the third threshold TH3, the correction calculating unit 83 sets the second fixed coefficient Ko2 (>Ko1) as the second amplitude adjusting coefficient Km. If the average value Vdmav is less than the third threshold TH3, the correction calculating unit 83 sets the third fixed coefficient Ko3 (>Ko2) as the second amplitude adjusting coefficient Km.

In the amplitude correction controlling process, the vibration controller 26 detects whether or not the abnormality exists in any of the first to fourth vibration elements 31 to 34 on the basis of the amplitudes Vdm1 to Vdm4 of the output voltages Vd1 to Vd4.

For example, it is assumed that the first vibration element 31 is out of order, or the abnormality in an adhesive state between the first vibration element 31 and the operation unit 21 exists. In this case, the amplitude Vdm1 of the output voltage Vd1 becomes equal to or less of threshold Vth, or the average value of the amplitudes Vdm (except for Vdm1) in such a case that the first vibration element 31 is vibrated becomes smaller than the average value of the amplitudes Vdm2 to Vdm4 in such a case that the first vibration element 31 is not vibrated by a predetermined value or more.

When the amplitude Vdm of the output voltage Vd is equal to or less of the threshold Vth, the voltage adjuster 57 of the vibration controller 26 can determine that the abnormality exists in the vibration element 30 that is corresponding to the output voltage Vd. When the average value of the amplitudes Vdm in the case of the vibrating is smaller than that in the case of the not vibrating by a predetermined value or more, the voltage adjuster 57 of the vibration controller 26 can determine that the abnormality exists with regard to each of the vibration elements 30.

Figure 8A:
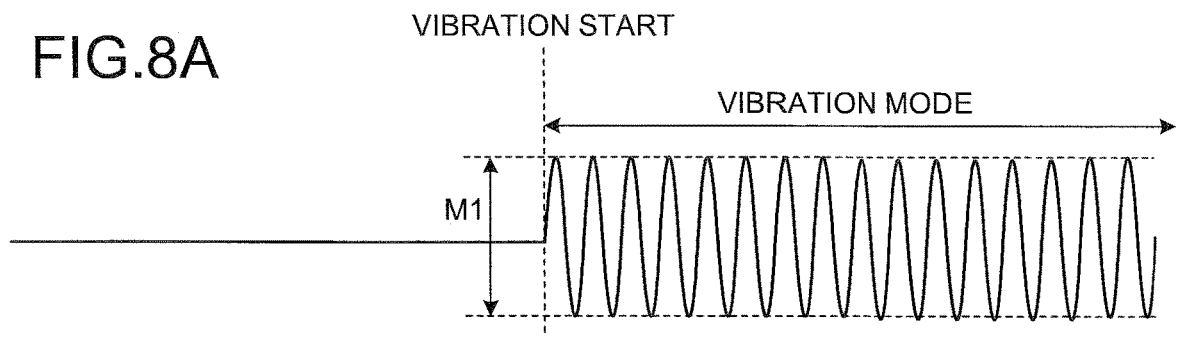
FIG. 8A to 8D are diagrams illustrating vibration states of the operation surface.

The variation in the vibration state of the operation surface 27 by execution of the correction mode will be here explained. FIGS. 8A to 8D are diagrams illustrating vibration states of the operation surface 27. As illustrated in FIG. 8A, when the vibration unit 22 is in an initial state, the operation surface 27 vibrates with the vibration amount M1. The vibration controller 26 starts to apply the drive voltage Vs to the vibration unit 22 on the basis of, for example, a user operation to the operation unit 21. From this, the vibration of the operation surface 27 is started.

Figure 8B:
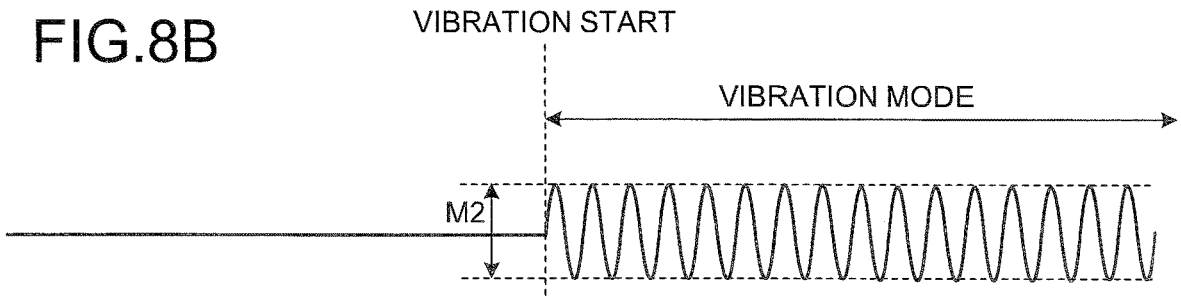

When the vibration unit 22 is in a deteriorated state, or when characteristics of the vibration unit 22 are varied by temperature change, as illustrated in FIG. 8B, the operation surface 27 sometimes vibrates with vibration amount M2 that is smaller than vibration amount M1.

Figure 8C:
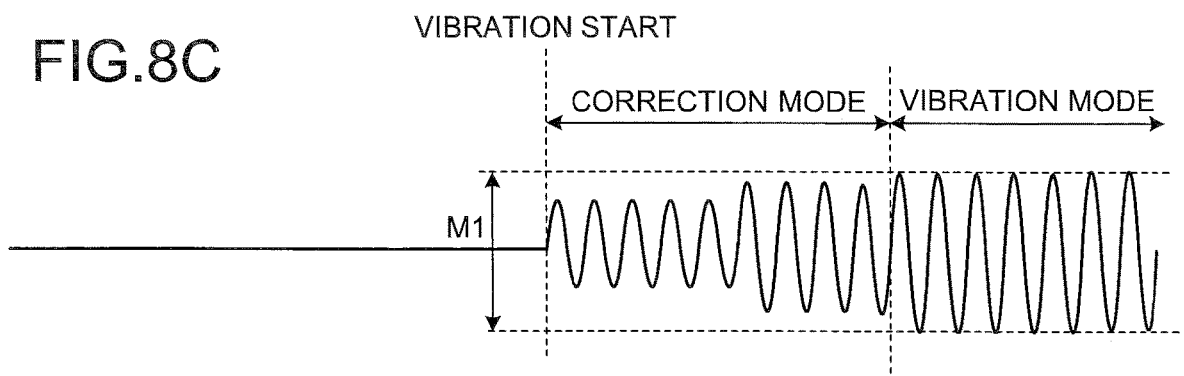

Therefore, as illustrated in FIG. 8C, the vibration controller 26 executes the correction mode, before executing the vibration mode, to adjust the amplitude Vm and the frequency fs of the drive voltage Vs that is applied to the vibration elements 30 of the vibration unit 22.

The vibration controller 26 applies the drive voltage Vs, in which the amplitude Vm and the frequency fs are adjusted, to the vibration elements 30 of the vibration unit 22 in the vibration mode to be executed subsequently. From this, in the vibration mode, the vibration amount of the operation surface 27 is adjusted to be the vibration amount M1 that is similar to that in an initial state.

In an example illustrated in FIG. 8C, because the correction mode is executed just before the execution of the vibration mode, the vibration amount of the operation surface 27 is small when the vibration is started, however, the vibration amount is adjusted immediately. In such a case that the vibration amount increases from small to large amount, the vibration amount can be adjusted without giving much uncomfortable feeling to the user. Moreover, because the correction mode is executed in the state where the vibration is needed, the vibration amount of the operation surface 27 can be adjusted while reducing the vibration time of the operation surface 27.

Figure 8D:
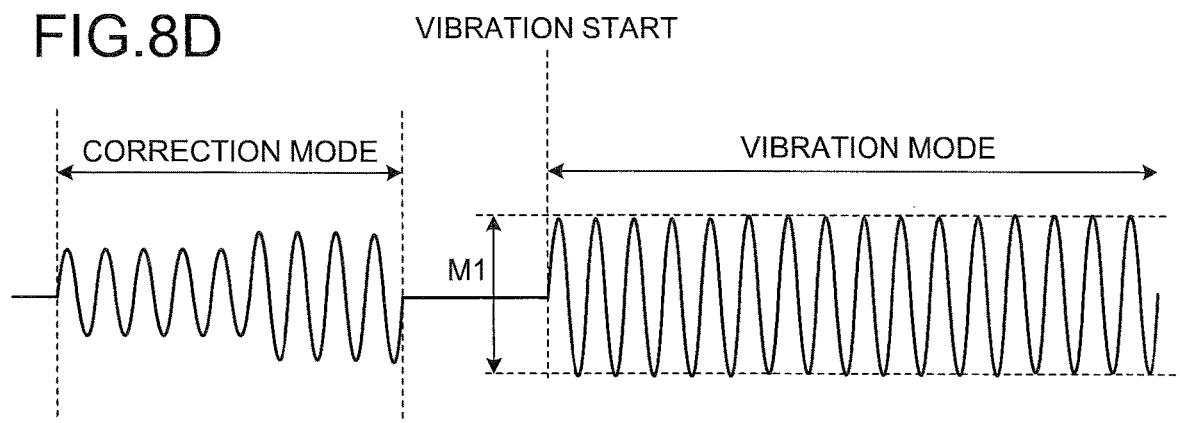

Moreover, as illustrated in FIG. 8D, the vibration controller 26 can execute the correction mode in a state where the user operation to the operation surface 27 is not performed. In this way, the correction mode is executed in a state where the user operation to the operation surface 27 is not performed, and thus the vibration amount of the operation surface 27 can be adjusted without giving the uncomfortable feeling to the user.

3. Processing of Input Device

Figure 9:
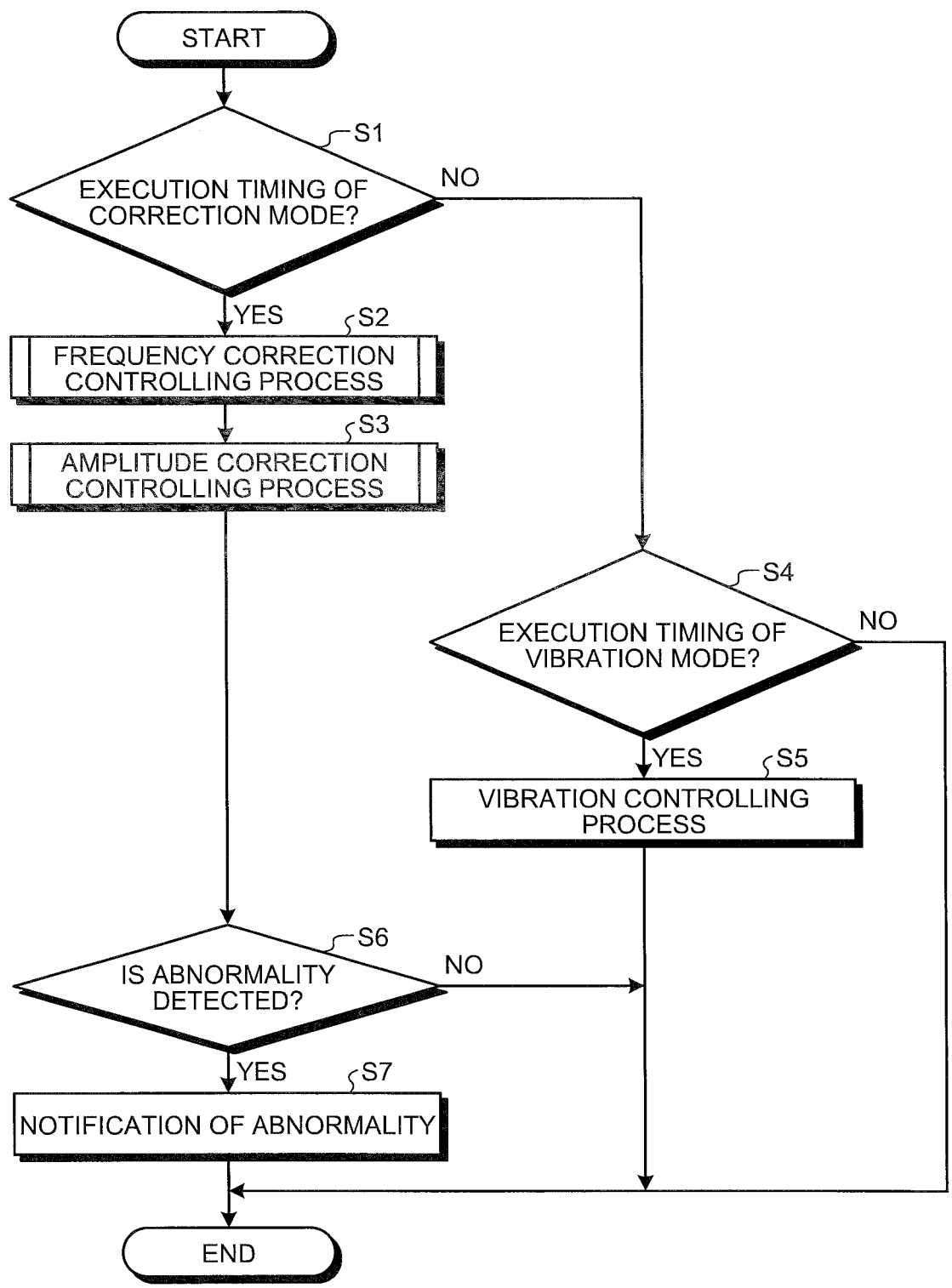
FIG. 9 is a flowchart illustrating a processing procedure executed by the vibration controller of the input device.

Next, the processing executed by the vibration controller 26 of the input device 12 will be explained with reference to FIG. 9. FIG. 9 is a flowchart illustrating a processing procedure executed by the vibration controller 26 of the input device 12, and the processing procedure is executed repeatedly by the vibration controller 26.

As illustrated in FIG. 9, the vibration controller 26 of the input device 12 determines whether or not it is an execution timing of the correction mode (Step S1). In this processing, for example, when the operation detector 24 detects a predetermined user operation, the vibration controller 26 determines that it is the execution timing of the correction mode.

For example, when the operation detector 24 does not detect a predetermined user operation, the vibration controller 26 may also determine that it is the execution timing of the correction mode. In this case, the cycle of the timing of the correction mode may be a predetermined cycle (for example, one hour or one day).

When the vibration controller 26 determines that it is the execution timing of the correction mode (Step S1: Yes), the vibration controller 26 executes the frequency correction controlling process (Step S2), and then executes the amplitude correction controlling process (Step S3).

On the other hand, when it is determined that it is not the execution timing of the correction mode (Step S1: No), the vibration controller 26 determines whether or not it is the execution timing of the vibration mode (Step S4). In this processing, for example, when the operation detector 24 detects a predetermined user operation, the vibration controller 26 determines that it is the execution timing of the vibration mode.

In such a case that the operation detector 24 executes the correction mode when a predetermined user operation is detected, if the correction mode is terminated, the vibration controller 26 can determine that it is the execution timing of the vibration mode.

When it is determined that it is the execution timing of the vibration mode (Step S4: Yes), the vibration controller 26 applies the drive voltages Vs1 to Vs4 to the vibration unit 22 to cause the first to fourth vibration elements 31 to 34 to vibrate (Step S5).

When the processing of Step S3 is terminated, the vibration controller 26 determines whether or not the abnormality is detected (Step S6). In this processing, as described above, for example, the vibration controller 26 detects, in the amplitude correction controlling process, whether or not the abnormality exists in any of the first to fourth vibration elements 31 to 34 on the basis of the amplitudes Vdm1 to Vdm4 of the output voltages Vd1 to Vd4.

When it is determined that the abnormality is detected (Step S6: Yes), the vibration controller 26 notifies, for example, the display controller 11 of the information on the vibration elements 30, within the first to fourth vibration elements 31 to 34, in which the abnormality exists (Step S7). Therefore, the user of the display apparatus 1 can grasp the abnormality of the vibration elements 30.

When the processing of Steps S5 and S7 are terminated, when it is determined that it is not the execution timing of the vibration mode (Step S4: No), and when it is determined that the abnormality is not detected (Step S6: No), the vibration controller 26 starts the processing from Step S1 in the next calculation cycle.

Figure 10:
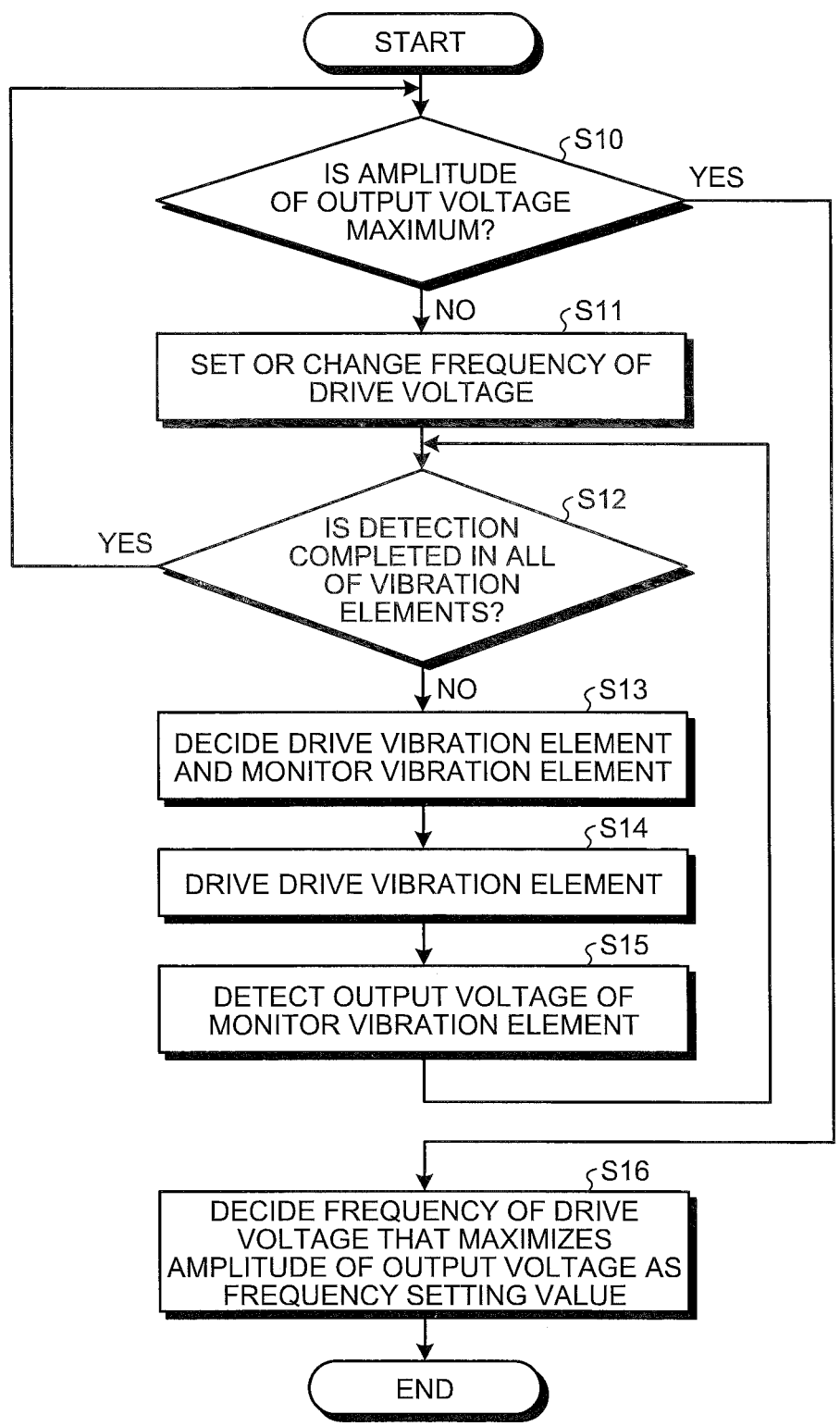
FIG. 10 is a flowchart illustrating a flow of a frequency correction control process of Step S2 illustrated in FIG. 9.

FIG. 10 is a flowchart illustrating a flow of a frequency correcting control process of Step S2 illustrated in FIG. 9. As illustrated in FIG. 10, the vibration controller 26 determines whether or not the amplitude Vdm of the output voltage Vd is maximum (Step S10).

In this processing, the vibration controller 26 can also determine whether or not the amplitude Vdm of the output voltage Vd is maximum by whether or not the average value of the amplitudes Vdm1 to Vdm4 is maximum, or whether or not one or more of the amplitudes Vdm1 to Vdm4 is locally maximum or maximum.

In Step S10, it is determined that the amplitude Vdm of the output voltage Vd is not maximum (Step S10: No), the vibration controller 26 sets or changes the frequency fs of the drive voltage Vs (Step S11). For example, the vibration controller 26 sets the frequency fs of the drive voltage Vs to be applied first to the initial value, and then changes the frequency fs of the drive voltage Vs to be applied by a predetermined value Δfs from the previous frequency.

Next, the vibration controller 26 determines whether or not detection of the amplitude Vdm of the output voltage Vd in all of the vibration elements 30 is completed for one of the frequencies fs (Step S12). When the vibration controller 26 determines that the detection of the amplitude Vdm of the output voltage Vd in all of the vibration elements 30 is completed (Step S12: Yes), the processing is shifted to Step S10.

On the other hand, when the vibration controller 26 determines that the detection of the amplitude Vdm of the output voltage Vd in all of the vibration elements 30 is not completed (Step S12: No), it decides one or more drive vibration elements and one or more monitor vibration elements (Step S13). The drive vibration element is the vibration element 30 that is for vibrating the operation surface 27, and the monitor vibration element is the vibration element 30 that is for detecting the vibration of the operation surface 27.

In the processing of Step S13, for example, the vibration controller 26 sets the first vibration element 31, the second vibration element 32, the third vibration element 33, and the fourth vibration element 34 as the monitor vibration element in this order, and decides the remaining three vibration elements 30 as the drive vibration element.

Next, the vibration controller 26 applies the drive voltage Vs to the one or more drive vibration elements decided in Step S13 (Step S14), and detects the output voltage Vd of the one or more monitor vibration elements decided in Step S13 (Step S15). Thereafter, the vibration controller 26 shifts the processing to Step S12.

When determining that the amplitude Vdm of the output voltage Vd is maximum (Step S10: Yes), the vibration controller 26 decides the frequency fs of the drive voltage Vs that maximizes the amplitude Vdm of the output voltage Vd as the frequency setting values fs1 to fs4 (Step S16).

Figure 11:
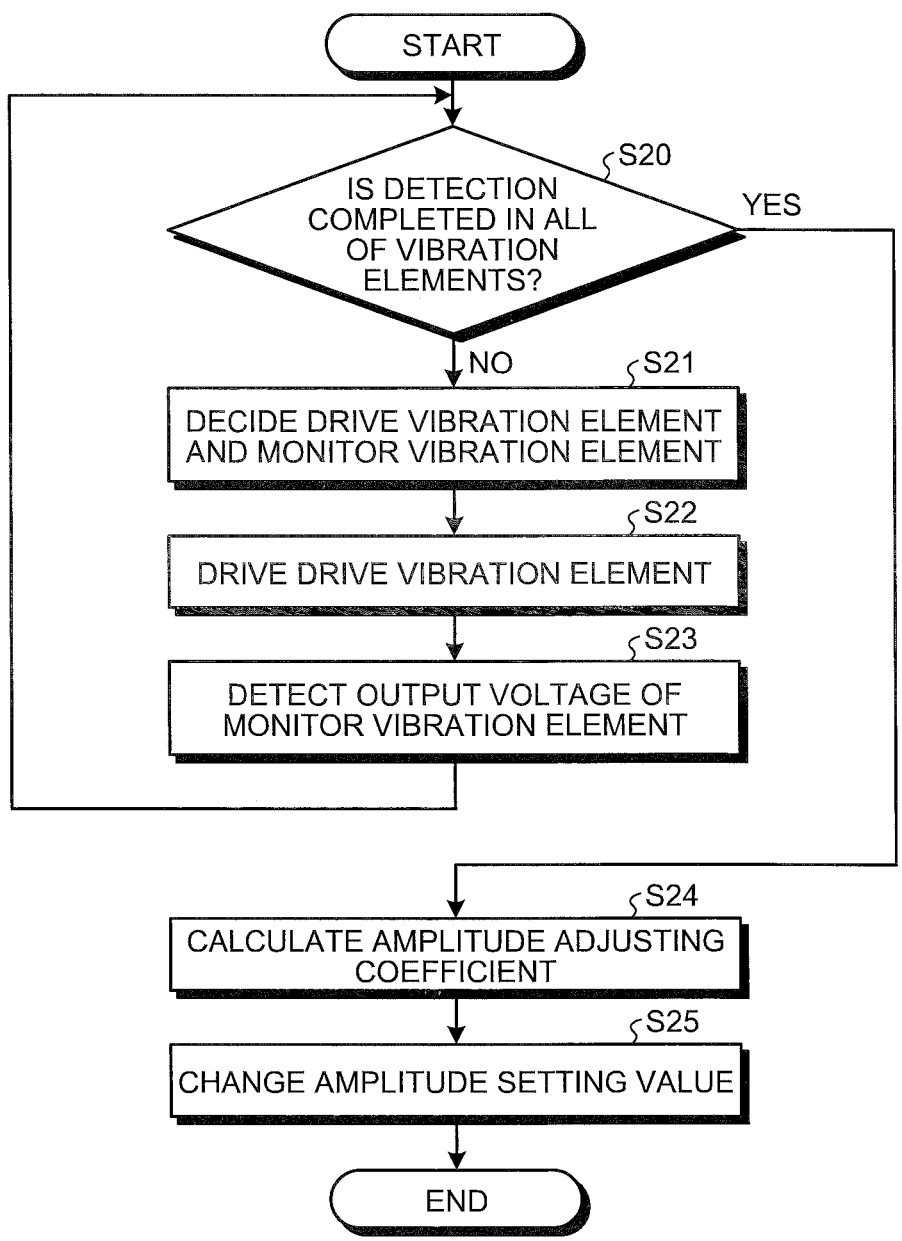
FIG. 11 is a flowchart illustrating a flow of an amplitude correction control process of Step S3 illustrated in FIG. 9.

FIG. 11 is a flowchart illustrating a flow of an amplitude correction control process of Step S3 illustrated in FIG. 9. As illustrated in FIG. 10, the vibration controller 26 determines first whether or not the detection of the amplitude Vdm of the output voltage Vd in all of the vibration elements 30 is completed (Step S20).

When it is determined that the detection of the amplitude Vdm of the output voltage Vd in all of the vibration elements 30 is not terminated (Step S20: No), the vibration controller 26 decides the one or more drive vibration elements and the one or more monitor vibration elements (Step S21). Step S21 is the processing that is similar to, for example, the processing of Step S13 illustrated in FIG. 10.

Next, the vibration controller 26 applies the drive voltage Vs to the one or more drive vibration elements decided in Step S21 (Step S22). The vibration controller 26 detects the output voltage Vd of one or more drive vibration elements decided in Step S21 (Step S23). When the processing of Steps S22 and S23 is terminated, the vibration controller 26 shifts the processing to Step S20.

In the processing of Step S20, when it is determined that the detection of the amplitude Vdm of the output voltage Vd in all of the vibration elements 30 is terminated (Step S20: Yes), the vibration controller 26 calculates the second amplitude adjusting coefficients Km (Step S24). In this processing, the vibration controller 26 can calculate the second amplitude adjusting coefficients Km on the basis of the aforementioned equations (1) to (4), the aforementioned equations (5) to (8), etc.

Next, the vibration controller 26 changes the amplitude setting values Vm1 to Vm4 on the basis of the second amplitude adjusting coefficients Km (Step S25). Therefore, the vibration controller 26 can apply the adequately adjusted drive voltages Vs1 to Vs4 to the first to fourth vibration elements 31 to 34.

In the aforementioned embodiment, an example in which both the frequency correction controlling process and the amplitude correction controlling process are executed by the vibration controller 26 is explained, however, the vibration controller 26 may execute at least one of them.

Moreover, in the aforementioned embodiment, an example in which three of the four vibration elements 30 are used as the one or more drive vibration elements, and one of the vibration elements 30 is used as the one or more monitor vibration element is mainly explained, however, the number of the one or more drive vibration elements and that of the one or more monitor vibration elements are not limited thereto. For example, two of the four vibration elements 30 may be set to be the one or more drive vibration elements, and remaining two of the vibration elements 30 may be set as the one or more monitor vibration elements.

In this case, for example, the first and third vibration elements illustrated in FIG. 1 may be set as the one or more drive vibration elements, and the second and fourth vibration elements may be set as the one or more monitor vibration elements. Moreover, the first and second vibration elements illustrated in FIG. 1 may be set as the one or more drive vibration elements, and the third and fourth vibration elements may be set as the one or more monitor vibration elements.

In the aforementioned example, an example in which the drive vibration element doubles as the monitor vibration element is explained, however, each of the drive vibration element and the monitor vibration element may be dedicated.

4. Hardware Configuration

Figure 12:
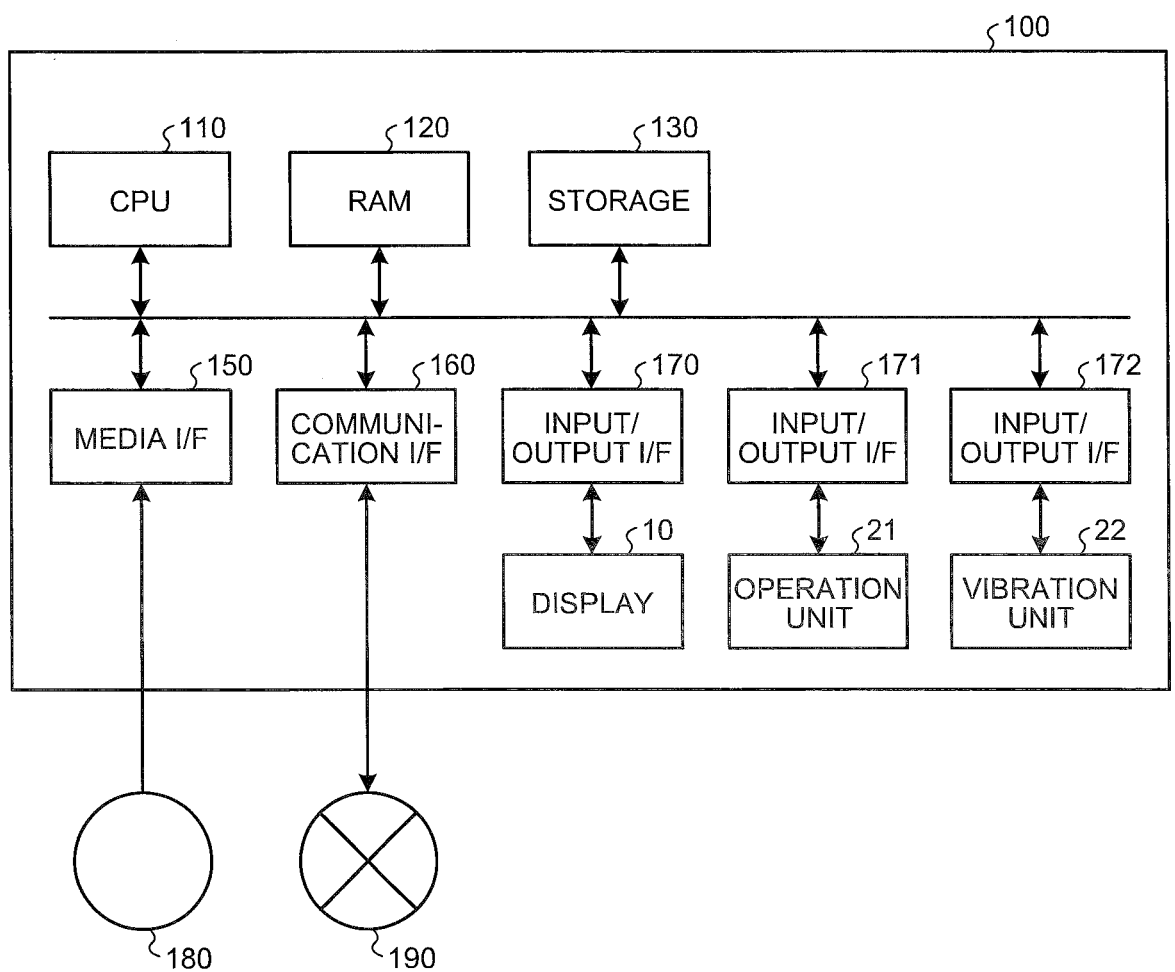
FIG. 12 is a diagram illustrating an example of a hardware configuration of a computer that realizes functions of the display apparatus.

The display apparatus 1 according to the present embodiment can be realized by a computer 100 whose configuration is illustrated in FIG. 12 as an example. FIG. 12 is a diagram illustrating an example of a hardware configuration of a computer that realizes functions of the display apparatus 1.

The computer 100 includes a CPU 110, a RAM 120, a storage 130, a media interface (media I/F) 150, a communication interface (communication I/F) 160, and input/output interfaces (input/output I/Fs) 170 to 172. The storage 130 is constituted of, for example, at least one of a Hard Disk Drive (HDD), a Solid State Drive (SSD), and a Read Only Memory (ROM).

The storage 130 stores, for example, a boot program that is executed by the CPU 110 at start-up of the computer 100, a program that depends on the hardware of the computer 100, the data used by the programs, etc.

The media I/F 150 reads the programs and the data stored in a storage medium 180, and supplies them to the CPU 110 through the RAM 120. The CPU 110 loads the programs onto the RAM 120 from the storage medium 180 through the media I/F 150, and executes the loaded programs. Or, the CPU 110 executes the programs by using the data. The storage medium 180 includes a magneto-optical medium such as a Digital Versatile Disc (DVD), a Secure Digital card (SD card), a Universal Serial Bus thumb drive (USB thumb drive), etc.

The communication I/F 160 receives the data from other devices through a network 190, and sends the data generated by the CPU 110 to other devices through the network 190. Or, the communication I/F 160 receives the programs from other devices through the network 190, and sends the programs to the CPU 110. The CPU 110 executes the sent programs.

The CPU 110 outputs the generated data to the display 10 such as a screen or an output unit such as a speaker through the input/output I/F 70 to control the display 10 and the output unit. The CPU 110 acquires the detected value according to the touch position of the user to the operation unit 2 through the input/output I/F 171. The CPU 110 outputs the drive voltage Vs to the vibration elements 30 of the vibration unit 22 through the input/output I/F 172 to control the vibration of the operation surface 27 of the operation unit 21, or to acquire the output voltage Vd of the vibration elements 30.

In such a case that the computer 100 functions as the display apparatus 1, the CPU 110 of the computer 100 executes the programs loaded onto the RAM 120, and thus realizes functions of each of the display controller 11, the operation detector 24, the vibration detector 25, and the vibration controller 26.

The CPU 110 of the computer 100, for example, reads these programs from the storage medium 180 and executes them. As another example, the CPU 110 of the computer 100 may acquire these programs from other devices through the network 190. Moreover, the storage 130, for example, may store the information that is stored in the initial value storage 81

5. Effects and Others

As described above, the input device 12 according to the present embodiment includes a plurality of the vibration elements 30 and the controller 23. The plurality of the vibration elements 30 vibrates the operation surface 27. The controller 23 detects, in such a state where operation surface 27 is vibrated by one or more of the plurality of the vibration elements 30 by the controller 23, the vibration state of the operation surface 27 by using at least one remaining vibration elements 30 of the plurality of vibration elements 30. As a result, for example, whether or not the vibration state of the operation surface 27 is varied by the aging deterioration or the temperature characteristics of a part of the input device 12 can be detected.

Moreover, the controller 23 can switches between the vibration mode (one example of first mode) and the correction mode (one example of second mode) and executes a mode selected by the switching, and the vibration mode is a mode in which the plurality of the vibration elements 30 are vibrated to vibrate the operation surface 27, and the correction mode is a mode in which the vibration state of the operation surface 27 is detected, in such a state that the operation surface 27 is vibrated by the one or more of the plurality of the vibration elements 30, by using the at least one remaining vibration elements 30. From this, the vibration elements 30 that are used for vibrating the operation surface 27 can be doubled as the vibration elements 30 that detect the vibration of the operation surface. Therefore, separately adding a part that detects the vibration of the operation surface 27 can be avoided, and thus the vibration state of the input device 12 can be detected while suppressing the cost and the number of parts.

The controller 23 includes the vibration controller 26 and the vibration detector 25. In the vibration mode, the vibration controller 26 applies the drive voltage Vs to each of the plurality of the vibration elements 30 to vibrate the plurality of the vibration elements 30, and further, applies the drive voltage Vs to one or more drive vibration elements (one example of one or more of vibration elements) to vibrate the one or more drive vibration elements in the correction mode. The vibration detector 25 detects the amplitude Vdm of the output voltage Vd (one example of vibration state of operation surface 27) on the basis of the voltage Vd output from one or more monitor vibration elements (one example of at least one remaining vibration elements) in the correction mode. Therefore, for example, when the vibration elements 30 are piezoelectric elements, whether or not the vibration state of the operation surface 27 is varied by the aging deterioration or the temperature characteristics of a part of the input device 12 can be detected precisely.

Moreover, the vibration controller 26 includes the voltage adjuster 57. The voltage adjuster 57 adjusts at least one of the amplitude Vm and the frequency fs (one example of vibration state of operation surface 27) of the drive voltage Vs to be applied to the one or more drive vibration elements on the basis of the amplitude Vdm of the output voltage Vd that is detected by the vibration detector 25. From this, for example, even when the resonance frequency of the operation unit 21 is varied, the frequency of the vibration elements 30 can be fitted to the resonance frequency of the operation unit 21, and further even when the vibration elements 30 are deteriorated, the vibration state of the operation unit 21 can be kept constant.

The voltage adjuster 57 adjusts at least one of the amplitude Vm and the frequency fs of the drive voltage Vs to be applied to the one or more drive vibration elements on the basis of the previously set first to third fixed coefficients Ko1 to Ko3 (one example of coefficients). Therefore, the drive voltage Vs can be easily adjusted without executing complicated calculation.

The voltage adjuster 57 adjusts at least one of the amplitude Vm and the frequency fs of the drive voltage Vs to be applied to the one or more drive vibration elements on the basis of the relation (for example, ratio) between the initial amplitude values Vmo1 to Vmo4 (one example of previously set reference values) and the amplitude Vdm of the output voltage Vd. Therefore, the drive voltage Vs can be adjusted precisely.

The vibration controller 26 includes the switching unit 56 that switches a vibration element, which detects the vibration state of the operation surface 27, from one to another of the vibration elements 30 in accordance with a predetermined rule in the correction mode. From this, the vibration state of the operation surface 27 by each of the vibration elements 30 can be detected, and further, for example, the deterioration and the failure of each of the vibration elements 30, the state of each of the vibration elements 30 for the operation unit 21, etc. can be precisely detected.

The voltage adjuster 57 adjusts at least one of the amplitude Vm and the frequency fs of the drive voltage Vs to be applied to the plurality of the vibration elements 30 on the basis of the vibration states of the operation surface 27 detected by the respective vibration elements 30 in a case where all of the plurality of the vibration elements 30 are selected by the switching unit 56 as the vibration elements 30 that detect the vibration states of the operation surface 27. Therefore, for example, the vibration of the operation surface 27 can be adjusted more precisely.

The controller 23 includes the operation detector 24 that detects a predetermined touch operation by the user to the operation surface 27. The vibration controller 26 executes the correction mode in such a state that the predetermined touch operation is detected by the operation detector 24. Therefore, the vibration amount of the operation surface 27 can be adjusted without giving uncomfortable feeling to the user.

Moreover, the controller 23 includes the operation detector 24 that detects a predetermined touch operation by the user to the operation surface 27. The vibration controller 26 executes the correction mode in such a state where the predetermined touch operation is not detected by the operation detector 24. Therefore, for example, when the vibration amount increases from small to large amount, the vibration amount can be adjusted without giving much uncomfortable feeling to the user.

The controller 23 executes the correction mode when the operation detector 24 starts to detect the predetermined touch operation, and then executes the vibration mode. Therefore, because the correction mode is executed in the state where the vibration is needed, the vibration amount of the operation surface 27 can be adjusted while reducing the vibration time of the operation surface 27.

The display apparatus 1 according to the embodiment includes the aforementioned input device 12 and the display 10 that displays an image in accordance with an input operation of the user that is accepted by the input device 12. From this, the display apparatus 1, which can detect whether or not the vibration state of the operation surface 27 is varied by the aging deterioration or the temperature characteristics of a part of the input device, can be provided.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An input device comprising:
a plurality of vibration elements that vibrate an operation surface, the plurality of vibration elements including a first vibration element and a second vibration element; and
a controller that detects, in a state where the controller causes the first vibration element of the plurality of vibration elements to vibrate the operation surface, a vibration state of the operation surface by using the second vibration element of the plurality of vibration elements, wherein
the controller includes:
a vibration controller that applies a drive voltage to the plurality of vibration elements to vibrate the plurality of vibration elements in a first mode, and applies the drive voltage to the first vibration element to vibrate the first vibration element in a second mode, the first mode being a mode in which the plurality of vibration elements, including the first vibration element and the second vibration element, are vibrated to vibrate the operation surface, and the second mode being a mode in which the first vibration element is vibrated to vibrate the operation surface, and the vibration state of the operation surface, being vibrated by the first vibration element, is detected by using the second vibration element; and a vibration detector that detects the vibration state of the operation surface based on a voltage output from the second vibration element in the second mode; and the controller is configured to:
switch between the first mode and the second mode to execute a switched mode;
adjust, based on the vibration state detected by the second vibration element during the second mode, at least one of an amplitude and a frequency of the drive voltage to be applied to the first vibration element so as to maintain a predetermined vibration amount of the operation surface during the first mode in which the plurality of vibration elements are vibrated to vibrate the operation surface;
switch the second vibration element, which detects the vibration state of the operation surface, among the plurality of vibration elements in accordance with a predetermined rule in the second mode; and
adjust at least one of the amplitude and the frequency of the drive voltage to be applied to the plurality of vibration elements based on vibration states of the operation surface detected by respective vibration elements of the plurality of vibration elements in a case where all of the plurality of vibration elements are sequentially switched by the controller as the second vibration element that detects the vibration state of the operation surface.

2. The input device according to claim 1, wherein the controller is further configured to adjust the amplitude of the drive voltage to be applied to the first vibration element based on a previously set coefficient.

3. The input device according to claim 1, wherein the controller is further configured to adjust the amplitude of the drive voltage to be applied to the first vibration element based on a relationship between a previously set reference value and the voltage output from the second vibration element.

4. The input device according to claim 1, wherein the controller includes an operation detector that detects a predetermined touch operation by a user to the operation surface, and the vibration controller executes the second mode in a state where the predetermined touch operation is detected by the operation detector.

5. The input device according to claim 1, wherein the controller includes an operation detector that detects a predetermined touch operation by a user to the operation surface, and the vibration controller executes the second mode in a state where the predetermined touch operation is not detected by the operation detector.

6. The input device according to claim 4, wherein the controller executes the second mode when the operation detector starts to detect the predetermined touch operation, and then executes the first mode.

7. A display apparatus comprising: the input device according to claim 1; and
a display that displays an image in accordance with an input operation of a user that is accepted by the input device.

8. The input device according to claim 1 further comprising:
a plurality of switches that are respectively connected to the plurality of vibration elements, wherein
the controller is further configured to:
generate the drive voltage to be applied, via switches that are respectively connected to the plurality of vibration elements, to the plurality of vibration elements;
in the first mode, turn on the switches to apply the generated drive voltage to the plurality of vibration elements; and
in the second mode, sequentially turn off a switch of the plurality of switches corresponding to the second vibration element.

9. A vibration state detecting method of an input device, the method comprising:
applying a drive voltage to a plurality of vibration elements, including a first vibration element and a second vibration element, to vibrate the plurality of vibration elements in a first mode, the first mode being a mode in which the plurality of vibration elements are vibrated to vibrate the operation surface;
applying the drive voltage to the first vibration element to vibrate the first vibration element in a second mode, the second mode being a mode in which the first vibration element is vibrated to vibrate the operation surface, and a vibration state of the operation surface, being vibrated by the first vibration element, is detected by using the second vibration element;
switching between the first mode and the second mode to execute a switched mode;
detecting, by using the second vibration element, the vibration state of the operation surface during the second mode;
adjusting, based on the vibration state detected by the second vibration element during the second mode, at least one of an amplitude and a frequency of the drive voltage to be applied to the first vibration element so as to maintain a predetermined vibration amount of the operation surface during the first mode in which the plurality of vibration elements are vibrated to vibrate the operation surface;
switching the second vibration element, which detects the vibration state of the operation surface, among the plurality of vibration elements in accordance with a predetermined rule; and
adjusting at least one of the amplitude and the frequency of the drive voltage to be applied to the plurality of vibration elements based on vibration states of the operation surface detected by respective vibration elements of the plurality of vibration elements in a case where all of the plurality of vibration elements are sequentially switched by the controller as the second vibration element that detects the vibration state of the operation surface.

* * * * *